Feb. 16, 1965   L. HORNBOSTEL   3,169,922
FILTER
Filed July 31, 1961   3 Sheets-Sheet 1

INVENTOR.
Lloyd Hornbostel
BY
ATTORNEYS

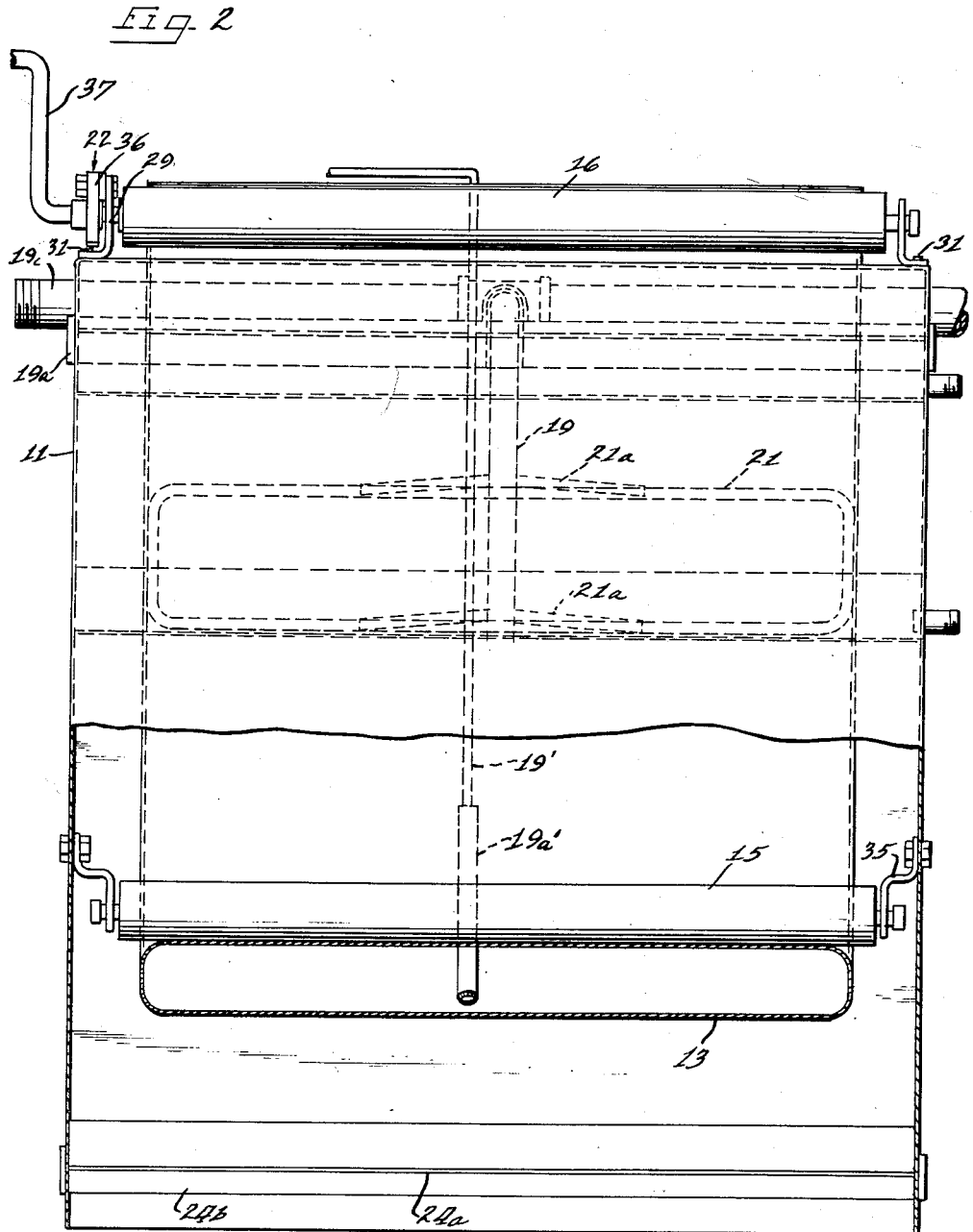

Feb. 16, 1965                L. HORNBOSTEL                3,169,922
                                 FILTER
Filed July 31, 1961                                 3 Sheets-Sheet 3
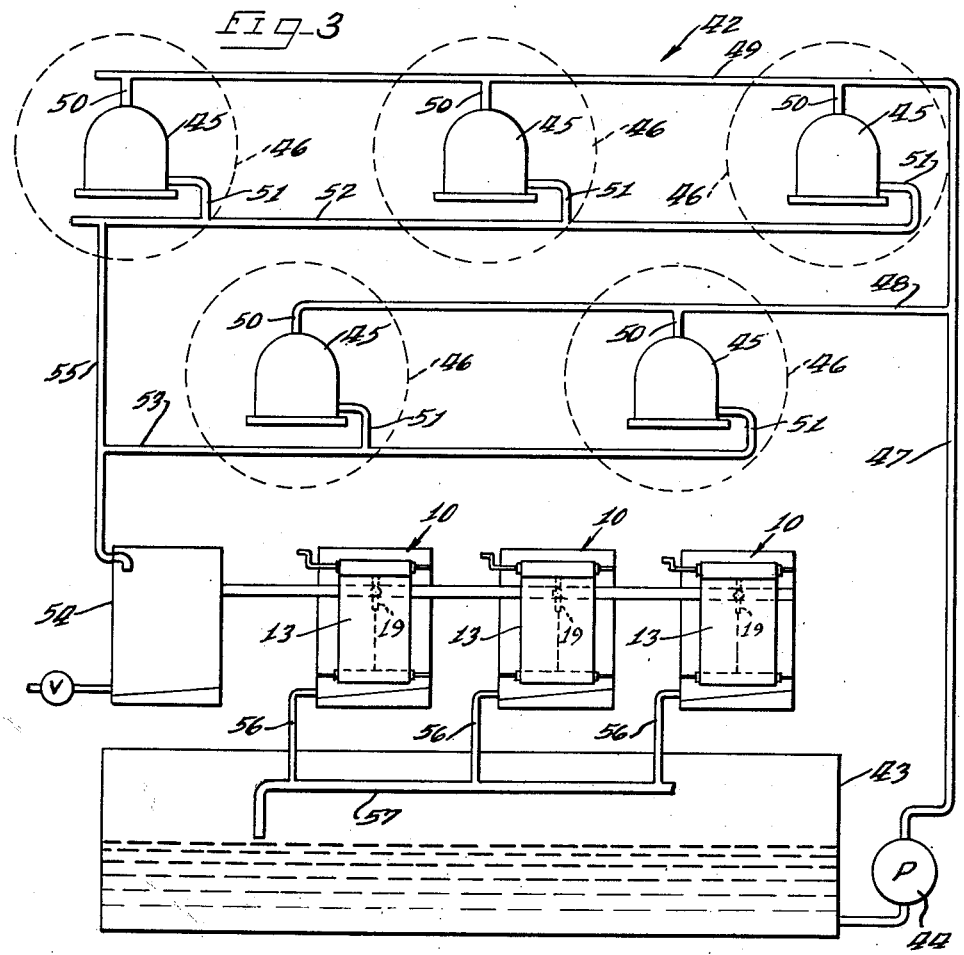
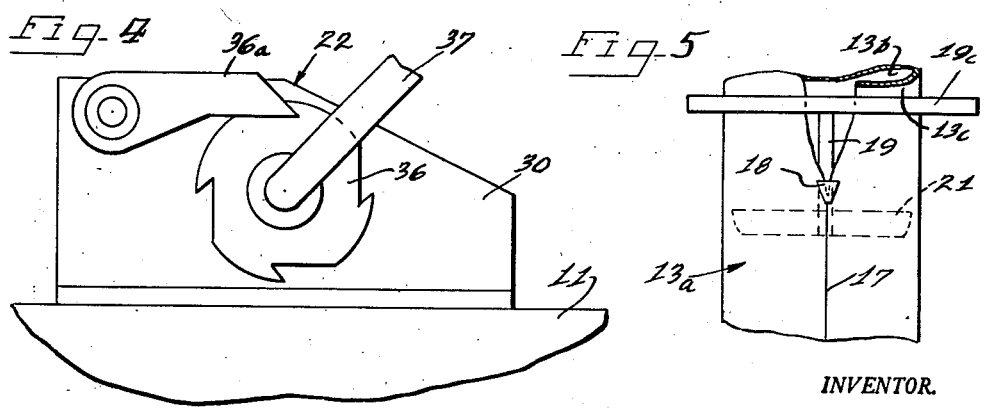
INVENTOR.
Lloyd Hornbostel
BY
ATTORNEYS

United States Patent Office 3,169,922
Patented Feb. 16, 1965

3,169,922
FILTER
Lloyd Hornbostel, Beloit, Wis., assignor to Beloit Corporation, Beloit, Wis., a corporation of Wisconsin
Filed July 31, 1961, Ser. No. 128,004
8 Claims. (Cl. 210—387)

This invention relates to a filter for removing contaminants from process liquids, for reclaiming materials such as the pulp fibers of white-water in the paper industry, and in other fields of use, and more particularly to a tubular filter which can be advanced as desired to present clean filter material without the use of a drum therefor.

An expansible filter web has been provided previously for use with a rotatable drum element, whereby contaminated portions of the web could be taken up successively. The present invention completely eliminates this drum structure by the use of a tubular filter element equipped with a sewn seam or zipper which may be torn, cut or pulled open as the tubular web thereof moves past an inlet feeding fluid to be filtered thereinto. The tubular filter is preferably stored on a storage roll and passed to a take-up roll, preferably around a roller or the like positioned beneath the storage and take-up rolls, so that the filtered fluid entering the tubular web is passed solely by gravity to outlet means which may include a receptacle and an outlet leading to an accumulator tank or the like. In order to avoid clogging or overloading of the filter until such time as the filter is further advanced, the system may be equipped with safety means which may be responsive to fluid level in the filter, and which may direct the fluid supply to another unit, or may actuate drive means to advance new filter material to the filter area in the receptacle.

Accordingly, it is an object of the present invention to provide a filter which is simple, efficient and relatively inexpensive in construction for a given filtering capacity.

Another object of the invention is to provide a filter which operates solely by gravitational flow.

Another object of the invention is to provide a filter which affords automatic by-passing of the liquid to the filter outlet in the event the filter becomes clogged or overloaded.

Another object of the invention is to provide a filter as described which completely eliminates a perforated drum as used with a previously available advanceable web filter.

Another object of the invention is to provide a tubular filter element which may be torn, cut or pulled open upon advancement so that an inlet tube or the like may be maintained in position to introduce fluid to be filtered into the tube.

Another object of the invention is to provide a tubular filter as described which may be made of a variety of materials to suit particular applications and which may be washed, dry cleaned and reused as long as permitted by the quality of the cleaned material.

Another object of the invention is to provide a filter which may be used in order to remove rust, dirt and other contaminants from process liquids such as chemicals, beverages, oils, fuels and varnishes.

Another object in the invention is to provide a filter as described which may be used in reclaiming processes, such as the filtering of white-water in the paper industry in order to reclaim the pulp fibers therefrom.

Another object of the invention is to provide a tubular filter as described which may also be used to prepare pulp fibers for shipment, in that the tubular filter element may be pressed after it becomes filled with fibers.

Another object of the invention is to provide a filter as described having a wide range of applications, suitable fields of use being found in the ore dressing industry and in the tempering of wheat before grinding thereof, for example.

Another object of the invention is to provide a filter as described which can be used in a plurality of filtering units to filter the lubricating oil used in a drier section of a paper machine.

Other objects and advantages of the invention will become apparent as the description proceeds, it being understood that for each particular application of the invention, changes may be made in either the design or form of the embodiments, within the scope of the invention.

In the drawings:

FIGURE 2 is an end elevational view, partly broken away and in vertical section, of the structure shown in FIGURE 1;

FIGURE 3 is a schematic showing of an application for the filter of the invention wherein a plurality of filtering units are utilized in filtering the lubricating oil used in a drier section of a paper machine;

FIGURE 4 is a diagrammatic side elevational view, partly broken away, of ratchet means for controlling the position of the filter tube of the invention in use; and FIGURE 5 is a front elevational view, partly broken away, of an embodiment of a filter tube according to the invention.

Figure 1:
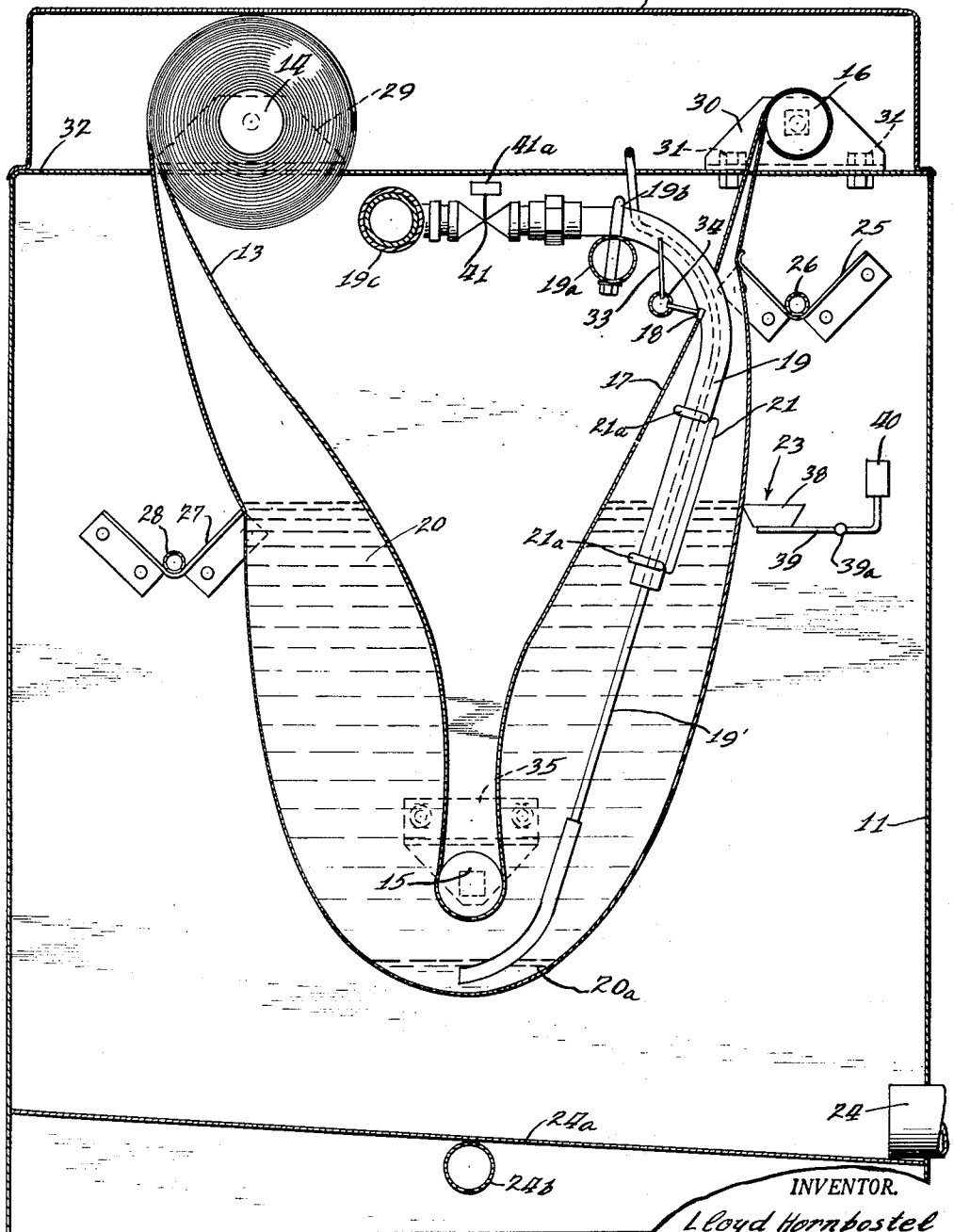
FIGURE 1 is a vertical sectional view of a filter unit according to the present invention.

Referring now to the drawings, and to FIGURES 1, 2, 4 and 5 in particular, a filtering unit 10 is shown according to the present invention which may be used, for example, in filtering a liquid such as oil, fuel or water. The unit 10, in the embodiment shown, may include a tank or receptacle 11 having a cover 12 which may be removed to permit installation of clean filter material 13 which may be nailed or stapled, or otherwise secured, to a roller 14. The length of tubular filter material is passed beneath an under roller or the like 15 and secured to a take-up roller 16. The tubular filter web has a zipper or seam 17, in one embodiment thereof, which may be opened by a zipper opener 18 which is preferably secured to an oil inlet or the like conduit 19. Thereby, and as hereinafter further described, a liquid 20 to be filtered may be admitted into the filter tube 13 through the inlet 19. The oil inlet 19 is equipped with a spreader 21, as also hereinafter described. Both of the rollers 14 and 16 are provided with ratchet mechanisms 22, as seen in FIGURE 4. An alarm or control means 23 is also provided, responsive to a clogged or overloaded condition of the filter 13. In the embodiment shown, the filter liquid 20 is accumulated in the bottom section of the tank 11 and from there flows through an outlet 24 into an accumulator tank or the like (not shown). A sloping bottom wall 24a supported by a pipe or the like 24b may be provided for this purpose. A tray 25 may be positioned in the apparatus 11 to catch any dirt that may drip from the roller 16 through the open zipper or seam 17, for release through a conduit 26; and a tray 27 may also be provided with a conduit 28 to lead to switch means on the outside of the unit 11 as an alternative to the means 23.

As noted, the filter material 13 is of tubular form in accordance with the present invention and may receive a liquid to be filtered therein so that filtering may be accomplished entirely by gravity and without the need for a perforated drum. The filter medium may be made of metallic mesh, woven or felted synthetic or natural fibers or other porous materials such as paper. In the event that the unit 10 is used for very fine filtration of chemicals or the like, a paper filter 13a may be used in which the paper material 13b is reinforced by cloth 13c.

This construction is shown in exemplary form in FIGURE 5.

After the top panel 12 has been removed, as noted, a roll of the clean filter material 13 can be installed on the roller 14 by nailing or stapling, where the roller is made of wood as is preferred. Thereby, the filter material can be easily attached. The roller 16 may similarly be made of wood for a ready connection of the filter element, although other materials may be substituted therefor and other means of connection provided. The rollers 14 and 16 may be mounted in suitable roller brackets or the like 29 and 30 which may be secured by bolts or the like 31 to a peripheral flange 32 on the unit 11, in the form shown.

Before the filter material is thus attached to the roller 16, the zipper or seam 17 should be opened. However, a sewn seam or a seamless filter tube may be used and in this event, the filter tube can be torn open or cut, in the manner afforded by the zipper 17. Where the zipper is used, the zipper opener 18 is attached to the oil inlet 19, as by a bracket element 33 and ring 34 or the like, so that the zipper is automatically pulled open as the material is wound onto the roller 16. It will be appreciated that where a seamless or sewn seam construction is provided in the filter element 13, a knife structure or the like may be positioned in a similar location with respect to the filter tube, thus affording continuous operability of the filter element with the tube or inlet 19 being positioned for introduction of the liquid to be filtered.

The tubular filter element 13 extends downwardly from the rollers 14 and 16 to a desired extent such as to provide a suitable extent of filling therein, it being understood that the continuous use of the filter in a given position will cause the level of the fluid 20 within the filter to rise gradually, as shown. The roller 15 may be secured to bracket means 35 in the tank 11 to determine the position of the roller, variations in the relationships shown being encompassed within the scope of the invention. It will also be understood that means other than the roller 15 may be used to guide the filter element between the rollers 14 and 16, and the filter element may simply hang naturally between the rollers with no guide means being employed, in particular instances.

Once the filter material 13 has been installed as described, the unit 10 is ready for operation. The liquid to be filtered may be admitted into the filter tube formed by the material 13 through the inlet 19. In a preferred form of the invention, the oil inlet 19 is equipped with a spreader 21, secured thereto by brackets 21a or the like and having a form such as may be provided by a generally smoothly contoured rectangular loop or other relatively wide structure to keep the filter tube evenly spread, thereby to avoid wrinkling and the like in the filter material as it is wound up onto the roller 16 as hereinafter described. The inlet 19 may be supported by bracket means such as the pipe structure 19a and connecting member 19b, and may be supplied from a conduit 19c as hereinafter set forth.

Depending upon the amount of liquid admitted to the unit, it is obvious that a certain amount of liquid will accumulate in the tubular filter element as shown, and thereby form a continuously changing head of the liquid. The weight of this liquid would tend to rotate both the rollers 14 and 16 in a direction to unwind the filter 13 therefrom which is in a counterclockwise direction in the example shown. In order to obviate this difficulty, both of the rollers 14 and 16 are equipped with ratchet means 21 as seen in FIG. 4 with respect to the roller 16, and which may include a ratchet member 36 secured to the roller and pall means 36a pivotally secured to a bracket 30 or the like. A handle or crank 37 is preferably connected to an associated journal end of each of the rollers. Thus the advancement of the filter material 13 is afforded as desired by operation of the handles 37, and without hazard of undesirable changes in the position of the filter. Thus in order to transfer the filter material 13 from the supply roll 14 to take-up roll 16, the pall means 36a must be released.

In some instances the liquid being filtered may contain another liquid immiscible therewith which will accumulate in the bottom of the pool inside the filter tube. Thus in the case of oil containing water an accumulation of water may be formed in the tube 13 at 20a. To remove this accumulation there is provided an outlet tube or pipe 19' mounted along one side of the inlet conduit 19 and projecting into the filter tube 13 through the opening provided by the opener 18. The bottom end of the tube 19' preferably has a flexible hose 19a' depending therefrom and extending to the bottom of the body of fluid in the tube 13. The outside end of the outlet tube 19' can be connected to a suction pump to withdraw the settled out liquid of the pond 20a.

As the oil is being filtered, the filter material 13 will eventually become clogged and dirty, and the liquid head formed in the filter tube will increase. In order to prevent an undesirable extent of clogging and filling, an alarm system may be used in accordance with the invention, to indicate by means of an electric bell or flashing light or the like (not shown) that the liquid level has risen to a predetermined level as shown. Thereupon, the operator may act to transfer the dirty filter material onto the roller 16 and to supply clean filter material to the filtering area from the roller 14, as described.

The embodiment of the alarm or control system disclosed in FIGURE 1 at 23 may include an oil catch pan 38 in contact with the filter material in the operative position of the filter material, and a pivot arm 39 suitably pivoted at 39a to the unit 11 and preferably biased by spring means (not shown) or the like to a horizontal position as shown. As the liquid level in the tubular filter rises above the top of the catch pan 38, liquid will accumulate in the said pan and will move the pan downwardly by gravity. The end of the arm 39 opposite the pan 38 thereupon is effective to actuate an alarm switch or device 40 to alert the operator.

As also seen in FIG. 1, the trough 27 may be positioned in a similar location and elevation and in contact with the tubular filter 13, as an alternative to the structure 23. The trough 27 has a conduit 28 opening thereinto and may be slightly inclined to conduct the overflow material to a catch pan, float or equivalent switch mechanism on the outside of the unit 11 to operate as described with respect to the means 23.

The switch means 40 may also energize a by-pass valve 41 which may be disposed in the conduit 19 or elsewhere in the conduit system, as by solenoid means or the like indicated diagrammatically at 41a, so that the dirty liquid by-passes the unit in which the liquid level in the filter tube has risen to the predetermined level, thereby leaving the operator sufficient time to change the filter material 13.

As noted, the filter liquid is accumulated in the bottom section of the tank 11 and flows from there through the outlet 24 into an accumulator tank or the like (not shown), from whence the liquid may be pumped to a point of use.

Referring now to FIGURE 3, a plurality of the filtering units 10 are shown in combination with the drier section 42 of a paper machine. It will, however, be understood that a variety of other industrial applications are encompassed within the scope of the invention. A tank 43 collects the filtered oil from the units 10, the oil being filtered and transmitted as hereinabove set forth. A pump 44 pumps the oil from the tank 43 into bearing housings 45 for each of the individual driers 46, through conduit 47 and branches 48 and 49 thereof leading to individual inlets 50 for the respective bearing housings 45. The oil is drained from the housings 45 through the individual conduits 51 and then accumulates in the headers 52 and 53 communicating therewith. From the headers 52 and 53, the oil is transported into a sump tank 54, through a conduit 55. The oil is then admitted to the respective filtering units 10 from the sump tank 54 and is filtered in the said units, as hereinabove set forth. The filtered oil may be drained from the filtering units 10 by means of pipes 56 corresponding to the outlet pipe 24, and through the header 57 into the accumulator tank 43. As described previously, the inlet conduits 19 which admit the oil into the filter tubes 13 may be equipped with solenoid valve means actuated by switch means such as generally indicated at 23 and 40, for example, so as to cause the oil to by-pass clogged units, until the proper function thereof has been restored. Restoration is very simply accomplished by advancing the filter element 13 of individually clogged units to a desired extent.

There has thus been provided a filter and system which is simple, efficient and relatively inexpensive in construction for a desired filtering capacity. Since the filter operates solely by gravitational flow, there is no need for complex auxiliary equipment and it may be rendered automatically responsive to a clogged condition or the like by by-pass means as herein set forth. Further, advancement of the filter tube may be accomplished readily despite the introduction of an inlet pipe into the tube, by zipper means or the ilke, creating an opening in the seam as the filter material is advanced. Because of the simple mode of advancement of the filter element from a storage to a take-up roller, as controlled by the ratchet means of the invention, the material will be in good condition after use, and thus may be cleaned in any suitable manner and reused.

Accordingly, the filter unit of the invention may be used to remove a variety of contaminants from process liquids such as chemicals, beverages, oil, fuels and varnishes, and may be used as a reclaiming means to recover desired materials from liquids, in such reclaiming processes as the filtering of white-water in paper industry applications, for example. In this regard, it may be noted that the tubular filter material provides a suitable container and may be pressed after it becomes filled with the reclaimed materials, such as paper pulp fibers. Applications in the oil industry and in the tempering of wheat before grinding are merely exemplary of the wide range of uses for the filter of the invention; and it will be understood that the filter element itself may be varied in the construction and material used therefor, and that the design of the equipment with which the filter element is used may be varied accordingly. It will, therefore, be appreciated that a fundamental improvement in the filtering, reclamation and processing arts has been provided whose potential uses extend through a broad range of applications.

Although I have herein set forth and described my invention with respect to certain specific principles in details thereof, it will be understood by those skilled in the art that these may be varied without departing from the spirit and scope of the invention as set forth in the hereunto appended claims.

I claim as my invention:

1. A filter unit comprising,
a flexible tubular filter element,
feeding means for feeding the element,
take-up means for receiving the used portion of the element,
    said take-up means being spaced longitudinally from said feeding means with said element having a portion depending downwardly from the take-up means in the space between the feeding means and the take-up means,
means for opening the filter element longitudinally located in advance of the take-up means,
and conduit means extending into said filter element through the opening formed therein for feeding fluid to the filter.

2. A filter unit comprising,
a flexible tubular filter element,
feeding means for feeding the element,
take-up means for receiving the used portion of the element,
    said take-up means being spaced longitudinally from said feeding means with said element having a portion depending downwardly from the take-up means in the space between the feeding means and the take-up means,
guide means positioned between said feeding means and said take-up means with said downwardly depending portion passing beneath the guide means,
means for opening the filter element longitudinally located in advance of the take-up means,
and conduit means extending into said filter element through the opening formed therein for feeding fluid to the filter.

3. A filter unit comprising,
a flexible tubular filter element,
feeding means for feeding the element,
take-up means for receiving the used portion of the element,
    said take-up means being spaced longitudinally from said feeding means with said element having a portion depending downwardly from the take-up means in the space between the feeding means and the take-up means,
cutting means positioned in advance of the take-up means engaging the filter element and forming a longitudinal slit in the filter element,
and conduit means extending into said filter element through the opening formed therein for feeding fluid to the filter.

4. A filter unit comprising,
a flexible tubular filter element having an openable zipper extending longitudinally therealong,
feeding means for feeding the element,
take-up means for receiving the used portion of the element,
    said take-up means being spaced longitudinally from said feeding means with said element having a portion depending downwardly from the take-up means in the space between the feeding means and the take-up means,
means for opening said zipper longitudinally located in advance of the take-up means,
and conduit means extending into said filter element through the opening formed therein for feeding fluid to the filter.

5. A filter unit comprising,
a flexible tubular filter element,
feeding means for feeding the element,
take-up means for receiving the used portion of the element,
    said take-up means being spaced longitudinally from said feeding means with said element having a portion depending downwardly from the take-up means in the space between the feeding means and the take-up means,
means for opening the filter element longitudinally located in advance of the take-up means,
first conduit means extending into said filter element through the opening formed therein for feeding fluid to the filter,
and second conduit means extending into said filter element through the opening formed therein and having an intake opening positioned near the base of said downwardly depending portion for removing material from within the filter element.

6. A filter unit comprising,
a flexible tubular filter element,
feeding means for feeding the element,
take-up means for receiving the used portion of the element, said take-up means being spaced longitudinally from said feeding means with said element having a portion depending downwardly from the take-up means in the space between the feeding means and the take-up means, means intermittently driving said take-up means for intermittently advancing the tubular filter element, means for opening the filter element longitudinally located in advance of the take-up means, and conduit means extending into said filter element through the opening formed therein for feeding fluid to the filter.

7. A filter unit comprising, a flexible tubular filter element, a feeding roll having a portion of the element wound thereon for feeding the element, a take-up roll having a portion of the element wound thereon for receiving the used portion of the element, said take-up roll being spaced longitudinally from said feeding roll with said element having a portion depending downwardly in the space between the rolls.

releasable locking means holding the rolls preventing unwinding thereof due to the weight of the downwardly depending portion of the filter element, means for opening the filter element longitudinally located in advance of the take-up means, conduit means extending into said filter element through the opening formed therein for feeding fluid to be filtered, and means for driving the take-up roll for advancing the filter element when the rolls are unlocked.

8. A filter unit comprising, a receptacle for receiving filtrate, a flexible tubular filter element, a feeding roll having a portion of the filter element wound thereon and being mounted on the receptacle, a take-up roll for receiving the used portion of the element with said used portion being wound thereon and being mounted on the receptacle, said rolls being at substantially the same elevation and being spaced apart longitudinally with said element having a portion depending downwardly into the receptacle in the space between the rolls, means supported on the receptacle for opening the filter element longitudinally located in advance of the take-up roll, guide means mounted in the receptacle with said downwardly depending portion of the filter element passing beneath the guide means, and conduit means extending into the filter element through the opening formed therein for feeding fluid to be filtered.

References Cited in the file of this patent
UNITED STATES PATENTS

| | | |
|---|---|---|
| 2,411,539 | Gunn | Nov. 26, 1946 |
| 2,664,203 | Crane et al. | Dec. 29, 1953 |
| 2,691,446 | Murray | Oct. 12, 1954 |